(12) United States Patent
Umeki et al.

(10) Patent No.: US 6,213,425 B1
(45) Date of Patent: *Apr. 10, 2001

(54) TAPE REEL FOR TAPE CASSETTE

(75) Inventors: Sadatoshi Umeki, Bertrange (LU); Hiroshi Kaneda; Masatoshi Okamura, both of Nagano (JP)

(73) Assignee: TDK Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,054

(22) Filed: Jun. 4, 1997

(30) Foreign Application Priority Data

Jun. 13, 1996 (JP) .................................. 8-172875

(51) Int. Cl.$^7$ .......................... B65H 75/12; G11B 23/087
(52) U.S. Cl. .................. 242/614.1; 242/345; 242/610.6; 360/132; D14/122; D8/358
(58) Field of Search .............................. 242/614.1, 345, 242/118.31, 610.6; 360/132; D14/122; D8/358

(56) References Cited

U.S. PATENT DOCUMENTS

| | | | |
|---|---|---|---|
| 3,099,414 | 7/1963 | Kulka | 242/614 |
| 3,289,972 | 12/1966 | Hafner | 242/118.7 |
| 4,664,328 | * 5/1987 | Yamada | 242/345 |
| 5,409,180 | * 4/1995 | Stewing | 242/614.1 |
| 5,472,150 | * 12/1995 | Teuber et al. | 242/345 |

FOREIGN PATENT DOCUMENTS

| | | |
|---|---|---|
| 0 136 504 A1 | 4/1985 | (EP) . |
| 0 549 289 A2 | 6/1993 | (EP) . |
| 2531688 | 2/1984 | (FR) . |
| 2009101 | 6/1979 | (GB) . |
| 54-80747 | 8/1979 | (JP) . |

* cited by examiner

Primary Examiner—John Q. Nguyen
(74) Attorney, Agent, or Firm—Lerner, David, Littenberg, Krumholtz & Mentlik, LLP

(57) ABSTRACT

A tape reel for a tape cassette capable of substantially preventing deformation thereof, even when it is thin-walled to substantially reduce a cycle time required for a molding step of the tape reel. The tape reel includes a reel hub and a disc-like flange. Reinforcing ribs include an annular rib arranged on an outer periphery of a disc-like flange and a plurality of linear ribs arranged on an outer surface of the disc-like flange so as to extend from a core stabilizing surface rib to the annular rib. The linear ribs are so arranged that each of the linear ribs intersects at least one of the other linear ribs at a position which is further than a midpoint between the core stabilizing surface rib and the annular rib.

28 Claims, 3 Drawing Sheets

TAPE REEL FOR TAPE CASSETTE

BACKGROUND OF THE INVENTION

This invention relates to a tape reel for a tape cassette, and more particularly to a tape reel adapted to be rotatably incorporated in a tape cassette to take up a tape thereon and deliver it therefrom.

A conventional tape reel used for such a purpose includes a reel flange, which is provided on a bottom surface thereof or a surface thereof opposite to a tape receiving surface thereof with reinforcing ribs in a manner to radially or concentrically extend thereon in order to prevent deformation of the reel flange due to a weight of a tape wound on the tape reel, as disclosed in, for example, Japanese Utility Model Application Laid-Open Publication No. 80747/1979.

However, an increase in width of the reinforcing rib to a level larger than a thickness of the flange causes sink marks to occur on a surface of the flange on which the ribs are not provided or the above-described tape receiving surface of the flange. Thus, in the conventional tape reel, it is required that the reinforcing ribs are formed with a width equal to or smaller than a thickness of the reel flange. Also, a weight-saving of the tape reel for the purpose of reducing a manufacturing cost thereof requires to reduce a thickness of the reel flange and concurrently reduce a width of the reinforcing ribs to avoid any sink mark.

Unfortunately, the conventional tape reel in which the reinforcing ribs are radially or concentrically arranged while reducing a thickness of the flange causes an increase in warpage of the flange and/or deflection thereof when a cycle time of molding the tape reel is shortened or reduced; whereas a variation in shape of an inner side of a reel stabilizing surface of the tape reel and/or shape of the ribs or an increase in the number of ribs causes an increase in weight of the tape reel. Thus, the conventional tape reel fails to uniformly reinforce the whole flange while keeping a weight of the flange from being increased. In particular, when the reinforcing ribs formed on the flange for the purpose of preventing any sink mark of the flange are reduced in width, the flange fails to exhibit sufficient strength or stiffness; so that a weight of a tape wound on the tape reel causes deformation of the reel flange. Such deformation is amplified during storage of the tape reel at a high temperature.

SUMMARY OF THE INVENTION

The present invention has been made in view of the foregoing disadvantage of the prior art.

Accordingly, it is an object of the present invention to provide a tape reel for a tape cassette which is capable of substantially shortening or reducing a cycle time of molding the tape reel.

It is another object of the present invention to provide a tape reel for a tape cassette which is capable of preventing deformation thereof due to a weight of a tape wound thereon and restraining deformation thereof during storage thereof at a high temperature.

It is a further object of the present invention to provide a tape reel for a tape cassette which is capable of reducing in a manufacturing cost thereof and simplified in structure thereof.

In accordance with the present invention, a tape reel for a tape cassette is provided. The tape reel includes a reel hub on which a tape is wound, a disc-like flange formed by molding it integrally with the reel hub and having an inner surface which receives the wound tape and an outer surface opposite from the inner surface, a core stabilizing surface rib arranged on the outer surface of the disc-like flange, and reinforcing ribs provided on the disc-like flange. The reinforcing ribs includes an annular rib arranged on the outer periphery of the disc-like flange and a plurality of linear ribs arranged on the outer surface of the disc-like flange so as to extend from the core stabilizing surface rib to the annular rib. The linear ribs are so arranged that each of the linear ribs intersect at least one of the other linear ribs at a position which is further than a midpoint between the core stabilizing surface rib and the annular rib.

In a preferred embodiment of the present invention, the linear ribs are so arranged that each of the linear ribs intersects at least one of the other linear ribs at a position located on the annular rib.

In a preferred embodiment of the present invention, the linear ribs are so arranged that each of the linear ribs intersects another one of the linear ribs at a position located on the core stabilizing surface rib.

In a preferred embodiment of the present invention, the linear ribs are so arranged that every two of the linear ribs opposite to each other with the reel hub being interposed therebetween are aligned with each other on a straight line. The linear ribs are so arranged that each linear rib intersects one of the other linear ribs at a position located on the annular rib and intersects another one of the linear ribs at a position located on the core stabilizing surface rib. Thus, the linear ribs in association with each other form a substantially star-like reinforcing rib structure.

In a preferred embodiment of the present invention, the linear ribs are each formed with a width substantially equal to a thickness of the flange and tapered toward a distal end thereof, resulting in being a trapezoid in section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a tape reel for a tape cassette according to the present invention will be described hereinafter with reference to the accompanying drawings.

Figure 1:
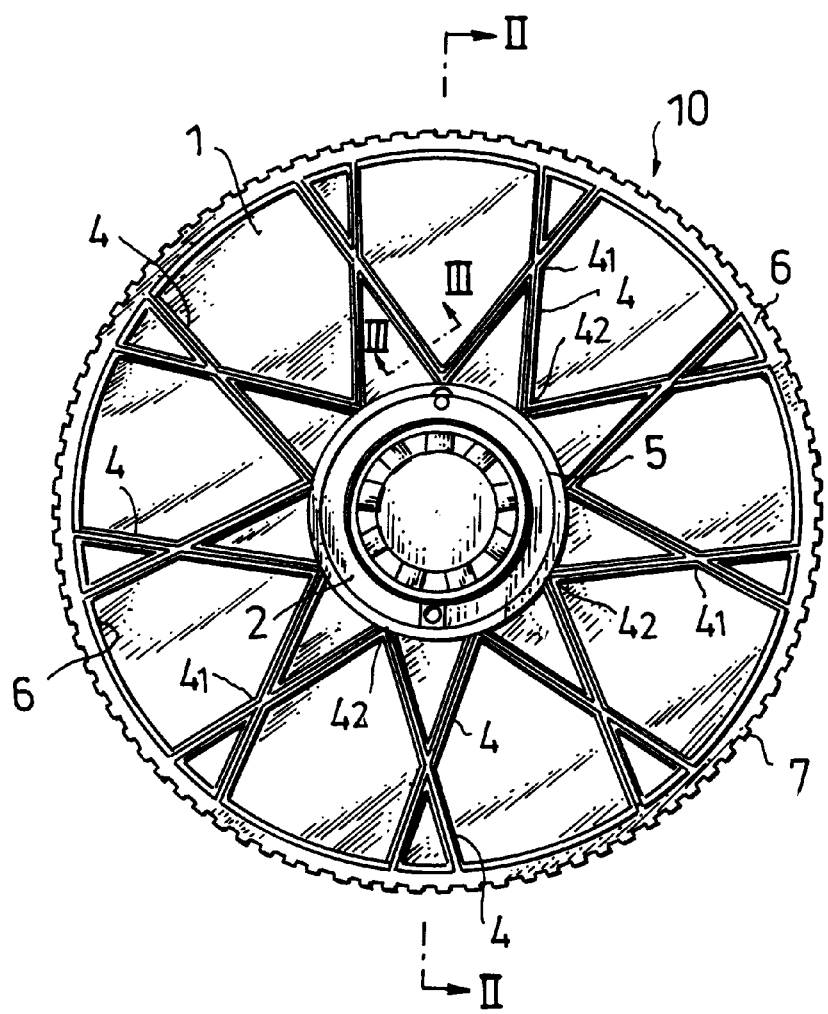
FIG. 1 is a bottom view showing an embodiment of a tape reel for a tape cassette according to the present invention.
Figure 2:
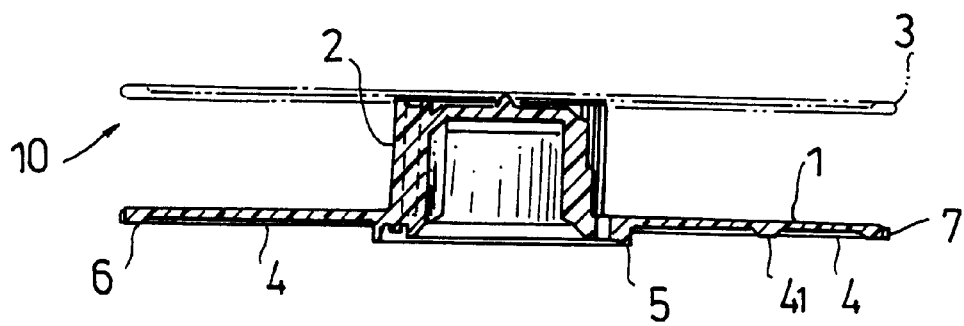
FIG. 2 is a vertical sectional view taken along line II—II of FIG. 1.
Figure 3:
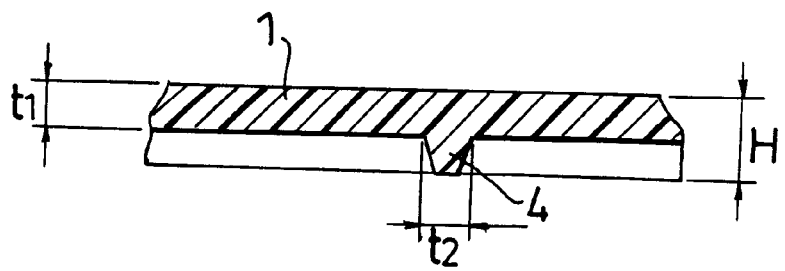
FIG. 3 is an enlarged vertical sectional view taken along line III—III of FIG. 1.

Referring first to FIGS. 1 to 3, an embodiment of a tape reel for a tape cassette according to the present invention is illustrated. A tape reel of the illustrated embodiment which is generally designated at reference numeral 10 is adapted to be arranged or incorporated in a VHS tape cassette. The tape reel 10 includes a reel hub 2 on which a tape is wound and a first disc-like flange 1 provided with the reel hub 2 integrally formed by molding so as to be positioned on a lower side thereof. The first disc-like flange 1 is formed so as to have an inner surface on which winding of the tape is carried out, an outer surface opposite from the inner surface. The tape reel 10 of the illustrated embodiment also includes a core stabilizing surface rib 5 provided on the outer surface of the first disc-like flange 1 and reinforcing ribs provided on the first disc-like flange 1. The tape reel 10 also includes a second disc-like flange 3 arranged so as to be positioned on an upper side of the reel hub 2. The reinforcing ribs include an annular rib 6 arranged on an outer periphery of the first disc-like flange 1 and a plurality of linear ribs 4 arranged on the outer surface of the first disc-like flange 1 in a manner to outwardly project therefrom and extend from the core stabilizing surface rib 5 to the annular rib 6. The linear ribs 4 are so arranged that each of the linear ribs 4 intersects one of the other linear ribs 4 at a position 4, which is further than a midpoint between the core stabilizing surface rib 5 and the annular rib 6, resulting in an intersection 4, between every adjacent two linear ribs 4 being defined at the position.

Figure 4:
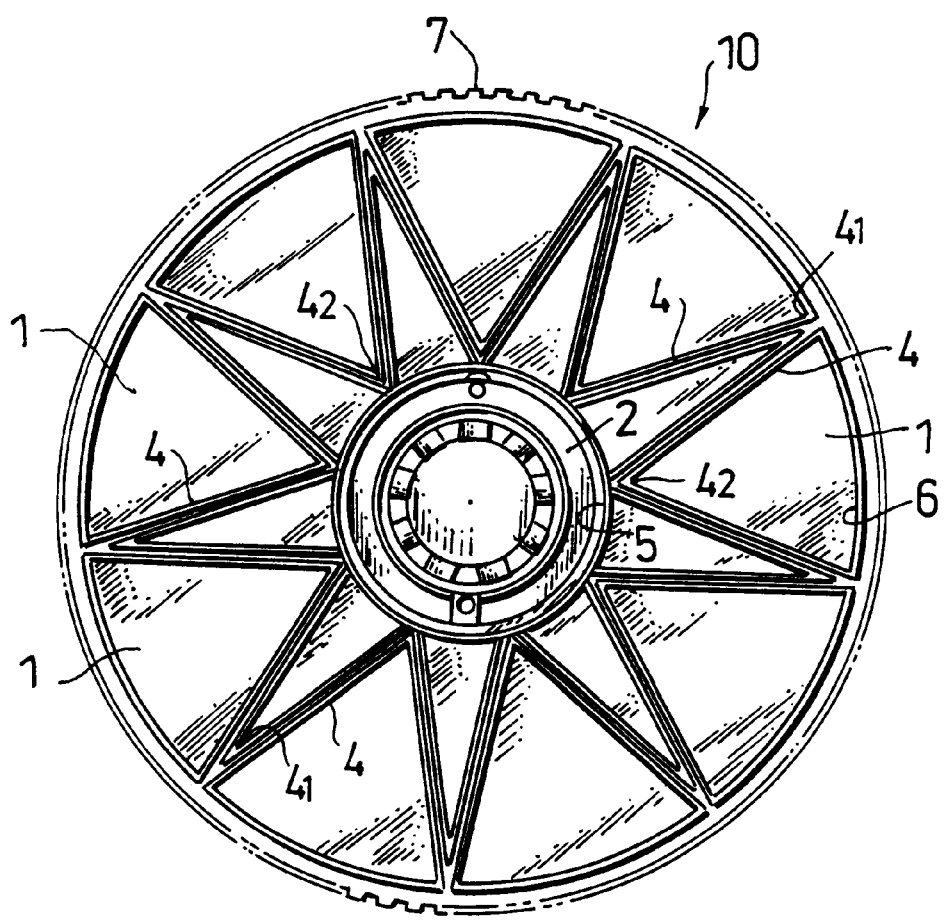
FIG. 4 is a bottom view showing another embodiment of a tape reel for a tape cassette according to the present invention.

In the illustrated embodiment, every adjacent two of the linear ribs 4 are arranged so as to intersect each other at an intermediate position between the core stabilizing surface rib 5 and the annular rib 6, as shown in FIG. 1. Alternatively, the linear ribs 4, as shown in FIG. 4, may be arranged in such a manner that each of the linear ribs 4 intersects one of the other linear ribs 4 at a position 4, located on the annular rib 6 and also intersects another one of the linear ribs 4 at a position 42 located on the core stabilizing surface rib 5. This results in the linear ribs 4 in association with each other form a substantially star-like reinforcing rib structure. Such construction enhances both aesthetic characteristics of the tape reel and appearance quality thereof.

In such a star-like reinforcing rib structure, every two of the linear ribs 4 opposite to each other with the reel hub 2 being interposed therebetween are aligned with each other on a straight line, and each of the linear ribs 4, as described above, alternately intersects two of the other linear ribs 4 adjacent thereto in order on the core stabilizing surface rib 5 and annular rib 6. Such construction facilitates manufacturing of a molding die for the tape reel while reducing the manufacturing cost.

Each of the linear ribs 4 may be arranged so as to intersect at least one of the other linear ribs 4 at an intersection 4,. Alternatively, each of the linear ribs 4 may further intersects another one of the linear ribs 4 or more at a plurality of intersections. For example, intersecting between each two adjacent linear ribs 4 may be carried out on either only the annular rib 6 or only a flat surface of the first disc-like flange 1. Further, the intersecting may be carried out at a position on each of two or more members selected from the flat surface of the flange 1, core stabilizing surface rib 5 and annular rib 6. Such arrangement of the linear ribs 4 ensures that the first disc-like flange 1 is substantially uniformly reinforced or stiffened, to thereby provide the tape reel free from any deflection or deformation.

The linear ribs 4 of the reinforcing ribs, as shown in FIG. 3, may each be formed with a width $t_2$ substantially equal to a thickness $t_1$ of the first disc-like flange 1 and tapered toward a distal end thereof, resulting in being in the form of a trapezoid shape in section. The first disc-like flange 1 is preferably formed with a thickness three fifth to one half as large as a whole thickness H including thicknesses of the linear rib 4 and flange 1, resulting in a cycle time required for a molding step of the tape reel being reduced.

Figure 5:
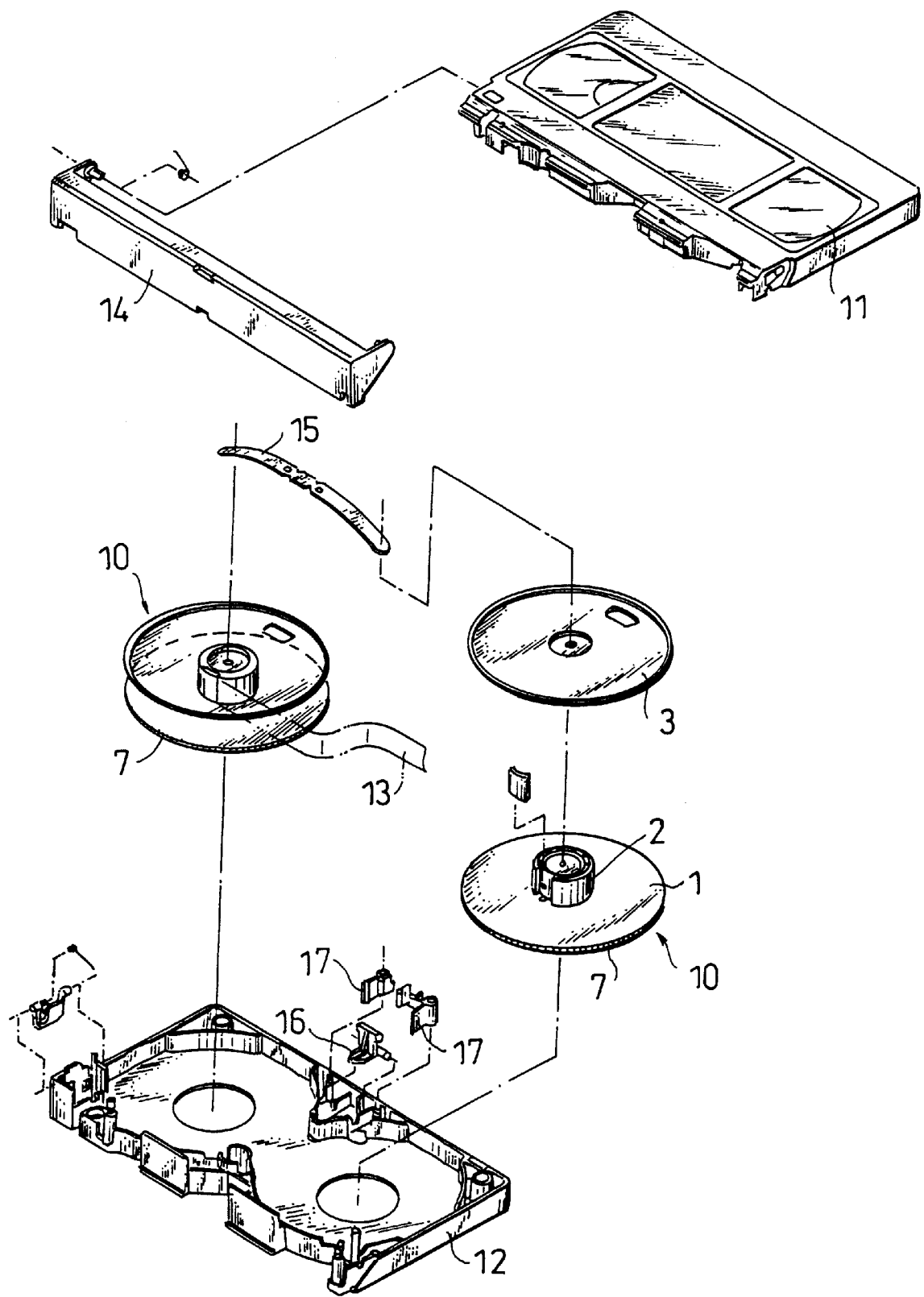
FIG. 5 is an exploded perspective view showing an example of a tape cassette in which tape reels of the present invention may be incorporated.

Referring now to FIG. 5, a VHS tape cassette in which a pair of the tape reels 10 of the illustrated embodiment each constructed as described above are adapted to be incorporated is illustrated by way of example. The tape cassette includes a casing formed by joining an upper casing member 11 and a lower casing member 12 to each other. The tape reels 10 are received in the casing and have a tape 13 wound thereon. The tape 13 is arranged so as to travel between the tape reels 10 in the casing while being guided through a front opening of the casing. The casing is pivotally provided on a front portion thereof with a front lid 14 so as to selectively cover the front opening of the casing and therefore a portion of the tape traveling through the opening. Also, the tape cassette includes a presser spring 15 for the tape reel 10, a pair of brake members 17 selectively engaged with respective lock gear 7 arranged on the tape reels 10, and an operation element 16. In the tape cassette thus constructed, the tape 13 is permitted to travel between the tape reels 10 for recording and reproduction.

As can be seen from the foregoing, the tape reel of the present invention is constructed in the manner that the reinforcing ribs include the annular rib arranged on the outer periphery of the disc-like flange and a plurality of the linear ribs arranged on the outer surface of the disc-like flange so as to extend from the core stabilizing surface rib to the annular rib. Also, the linear ribs are so arranged that each of the linear ribs intersects at least one of the other linear ribs at a position which is further than a midpoint between the core stabilizing surface rib and the annular rib. Such construction of the present invention substantially prevents deformation of the tape reel having a tape wound thereon, even when the flange is thin-walled to substantially shorten a tape reel molding cycle or reduce a period of time required for a molding step of the tape reel. Also, it effectively restrains deformation of the tape reel during storage thereof at a high temperature. Further, it provides the tape reel with strength or rigidness sufficient to withstand stress applied thereto during taking-up of a tape thereon or storage thereof at an increased temperature, to thereby prevent deformation and/or deflection thereof. Moreover, it contributes to weight- and cost-savings of the tape reel, improves moldability thereof and permits it to exhibit increased reliability.

While preferred embodiments of the invention have been described with a certain degree of particularity with reference to the accompanying drawings, obvious modifications and variations are possible in light of the above teachings. It is therefore to be understood that within the scope of the appended claims, the invention may be practiced otherwise than as specifically described.

What is claimed is:

1. A tape cassette comprising a casing, a pair of tape reels received in said casing, and a tape connected to and extending between said tape reels so as to travel between said tape reels, wherein each of said tape reels includes:

a reel hub on which said tape is wound, said reel hub having an upper end and a lower end;

a disc-like flange formed by molding it integrally with said reel hub on said lower end of said reel hub and having an inner surface on which said wound tape is carried, an outer surface opposite from said inner surfaces and an outer periphery on said flange;

a core stabilizing surface rib arranged on said outer surface of said disc-like flange; and a plurality of reinforcing ribs provided on said disc-like flange, said core stabilizing surface rib having an annular shape;

said plurality of reinforcing ribs including an annular rib arranged on said outer periphery of said disc-like flange and a plurality of linear ribs arranged on said outer surface of said disc-like flange extending from said said core stabilizing surface rib having a height greater than a height of said annular rib so as to project from said outer surface of said flange beyond said annular rib;

said disc-like flange having a midpoint between said core stabilizing surface rib and said annular rib;

said linear ribs being so arranged that each of said linear ribs intersects at least one of the other of said linear ribs at a position which is spaced in a radial direction from said core stabilizing surface rib further than said midpoint between said core stabilizing surface rib and said annular rib.

2. A tape cassette as defined in claim 1, wherein said plurality of linear ribs are so arranged that each of said linear ribs intersect said at least one of said other linear ribs at a position located on said annular rib.

3. A tape cassette as defined in claim 2, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

4. A tape cassette as defined in claim 2, wherein said plurality of linear ribs are so arranged that each o said linear ribs intersect another one of said linear ribs at a position located on said core stabilizing surface rib.

5. A tape cassette as defined in claim 4, wherein said plurality of linear ribs are so arranged that every two of said linear ribs opposite to each other with said core stabilizing surface rib being interposed therebetween are aligned with each other on a straight line.

6. A tape cassette as defined in claim 5, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end, remote from said disc-like flange and being tapered toward said distal end.

7. A tape cassette as defined in claim 4, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

8. A tape cassette as defined in claim 2, wherein said plurality of linear ribs are so arranged that every two of said linear ribs opposite to each other with said core stabilizing surface rib being interposed therebetween are aligned with each other on a straight line.

9. A tape cassette as defined in claim 8, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

10. A tape cassette as defined in claim 1, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

11. A tape cassette as defined in claim 1, wherein said plurality of linear ribs are so arranged that each of said linear ribs intersect another one of said linear ribs at a position located on said core stabilizing surface rib.

12. A tape cassette as defined in claim 11, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

13. A tape cassette as defined in claim 11, wherein said plurality of linear ribs are so arranged that every two of said linear ribs opposite to each other with said core stabilizing surface rib being interposed therebetween are aligned with each other on a straight line.

14. A tape cassette as defined in claim 13, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

15. A tape cassette as defined in claim 1 wherein said plurality of linear ribs are so arranged that every two of said linear ribs opposite to each other with said core stabilizing surface rib being interposed therebetween are aligned with each other on a straight line.

16. A tape reel as defined in claim 15, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end remote from said disc-like flange and being tapered toward said distal end.

17. A tape cassette as defined in claim 1, wherein said plurality of linear ribs are so arranged that every two of said linear ribs opposite to each other with said core stabilizing surface rib being interposed therebetween are aligned with each other on a straight line; and said plurality of linear ribs are so arranged that each at said linear ribs intersect said at least one of said other linear ribs at a position located on said annular rib and intersects another one of said plurality of linear ribs at a position located on said core stabilizing surface rib, whereby said linear ribs in association with each other form a substantially star-like reinforcing rib structure.

18. A tape cassette as defined in claim 17, wherein said disc-like flange has a thickness and said plurality of linear ribs have a trapezoidal cross-sectional shape, each formed with a width adjacent said disc-like flange, said width being substantially equal to said thickness of said disc-like flange, said linear ribs having a distal end, remote from said disc-like flange and being tapered toward said distal end.

19. A tape reel for a tape cassette, comprising:

a reel hub on which tape is wound, said reel hub having a pair of axial ends;

a disc-like flange formed integrally with said reel hub on at least one of said ends of said reel hub and having an inner surface facing said hub, an outer surface opposite from said inner surface, and an outer periphery on said flange;

a core stabilizing surface rib arranged on said outer surface of said flange, said core stabilizing surface rib having an annular shape; and a plurality of reinforcing ribs provided on said disc-like flange, including an annular rib arranged on said outer periphery and a plurality of linear ribs arranged on said outer surface of said disc-like flange, said linear ribs extending from said core stabilizing surface rib to said annular rib;

said core stabilizing surface rib having a height greater than a height of said annular rib so as to project from said outer surface of said flange beyond said annular rib;

said disc-like flange having a midpoint between said core stabilizing surface rib and said annular rib;

said linear ribs being so arranged that each of said linear ribs intersects a first adjacent linear rib at a position which is spaced in a radial direction from said core stabilizing surface rib further than said midpoint between said core stabilizing surface rib and said annular rib.

20. A tape reel as defined in claim 19, wherein each of said linear ribs intersects said first adjacent linear rib at a position located on said annular rib.

21. A tape reel as defined in claim 20 wherein said linear ribs are so arranged that every two of said linear ribs opposite to each other with said core stabilizing surface rib being interposed therebetween are aligned with each other on a straight line.

22. A tape reel as defined in claim 21, wherein said linear ribs are so arranged that each of said linear ribs intersect a second adjacent linear rib at a position located on said core stabilizing surface rib, forming a substantially star-like reinforcing rib structure.

23. A tape reel as defined in claim 22, wherein said flange has a thickness and said linear ribs have a trapezoidal cross-sectional shape.

24. A tape reel as defined in claim 23, wherein said linear ribs are formed with a width adjacent said flange, said width being substantially equal to said thickness of said flange, said linear ribs having a distal end remote from said flange and being tapered toward said distal end.

25. A tape cassette comprising a casing, a pair of tape reels received in said casing, and a tape extending between said tape reels so as to travel between said tape reels, wherein each of said tape reels includes:

a reel hub on which said tape is wound, said reel hub having an upper end and a lower end;

a disc-like flange formed by molding it integrally with said reel hub on said lower end of said reel hub and having an inner surface on which said wound tape is carried, an outer surface opposite from said inner surface and an outer periphery;

a core stabilizing surface rib arranged on said outer surface of said disc-like flange; and a plurality of reinforcing ribs provided on said disc-like flange;

said plurality of reinforcing ribs including an annular rib arranged on said outer periphery of said disc-like flange and a plurality of linear ribs arranged on said outer surface of said disc-like flange extending from said core stabilizing surface rib to said annular rib;

said disc-like flange having a midpoint between said core stabilizing surface rib and said annular rib;

said linear ribs being arranged so that each of said linear ribs only intersects a first adjacent linear rib on one side and a second adjacent linear rib on another side, the intersection with the first adjacent linear rib at a position on said core stabilizing surface rib and the intersection with the second adjacent linear rib at a position on said annular rib.

26. A tape reel as defined in claim 25, wherein said linear ribs are arranged opposite to another linear rib with said reel hub being interposed therebetween and are aligned with each other on a straight line.

27. A tape reel as defined in claim 25, wherein each of said linear ribs are arranged opposite to another linear rib with said reel hub being interposed therebetween and are aligned with each other on a straight line; whereby said linear ribs in association with each other form a substantially star-like reinforcing rib structure.

28. A tape reel as defined in claim 25, wherein said linear ribs are each formed with a width substantially equal to a thickness of said flange and tapered in an axial direction, toward so that said linear ribs have the shape of a trapezoid in section.

* * * * *

UNITED STATES PATENT AND TRADEMARK OFFICE
CERTIFICATE OF CORRECTION

PATENT NO. : 6,213,425 B1  
DATED : April 10, 2001  
INVENTOR(S) : Umeki et al.

Page 1 of 1

It is certified that error appears in the above-identified patent and that said Letters Patent is hereby corrected as shown below:

Column 3,  
Lines 19, 21, 29, and 46, "4," should read -- $4_1$ --.  
Line 31, "42" should read -- $4_2$ --.

Column 4,  
Line 62, "surfaces" should read -- surface, --.

Column 5,  
Line 4, before "surface" insert -- core stabilizing surface rib to said annular rib, --.  
Line 29, "o" should read -- of --.  
Line 42, cancel ",".

Column 6,  
Line 5, "intersect" should read -- intersects --.  
Line 43, "at" should read -- of --.  
Line 55, cancel ",".

Column 8,  
Line 41, cancel "toward".

Signed and Sealed this

Nineteenth Day of February, 2002

*Attest:*

*Attesting Officer*

JAMES E. ROGAN  
*Director of the United States Patent and Trademark Office*